United States Patent
Ito et al.

(10) Patent No.: US 10,654,456 B2
(45) Date of Patent: May 19, 2020

(54) DEFLECTION CONTROL APPARATUS

(71) Applicant: TOYOTA JIDOSHA KABUSHIKI KAISHA, Toyota-shi, Aichi-ken (JP)

(72) Inventors: Hironori Ito, Susono (JP); Akira Nagae, Susono (JP); Ryo Inomata, Ashigarakami (JP); Masayuki Ikeda, Susono (JP)

(73) Assignee: TOYOTA JIDOSHA KABUSHIKI KAISHA, Toyota-sji, Aichi-ken (JP)

( * ) Notice: Subject to any disclaimer, the term of this patent is extended or adjusted under 35 U.S.C. 154(b) by 192 days.

(21) Appl. No.: 15/900,888

(22) Filed: Feb. 21, 2018

(65) Prior Publication Data

US 2018/0251107 A1  Sep. 6, 2018

(30) Foreign Application Priority Data

Mar. 2, 2017 (JP) ................. 2017-039595

(51) Int. Cl.
*B60W 10/20* (2006.01)
*B60R 21/01* (2006.01)
*B60T 7/12* (2006.01)
*B60W 30/12* (2020.01)
*B60T 8/1755* (2006.01)

(52) U.S. Cl.
CPC ............ *B60T 8/17557* (2013.01); *B60T 7/12* (2013.01); *B60T 2201/083* (2013.01); *B60T 2220/03* (2013.01)

(58) Field of Classification Search
None
See application file for complete search history.

(56) References Cited

U.S. PATENT DOCUMENTS

| | | | | |
|---|---|---|---|---|
| 2005/0080532 A1* | 4/2005 | Kato | .................... | B60T 8/1764 701/41 |
| 2009/0063001 A1* | 3/2009 | Ueda | ........................ | B60T 8/00 701/79 |
| 2014/0330501 A1* | 11/2014 | Watanabe | ............. | B60T 8/1755 701/90 |
| 2015/0298726 A1* | 10/2015 | Aoki | .................... | B62D 5/0463 701/43 |
| 2015/0344068 A1* | 12/2015 | Taniguchi | ............ | B62D 15/025 701/41 |

FOREIGN PATENT DOCUMENTS

| | | | |
|---|---|---|---|
| JP | 2006-282168 A | | 10/2006 |
| JP | 2006282168 A | * | 10/2006 |
| JP | 2012-96571 A | | 5/2012 |

* cited by examiner

*Primary Examiner* — Adam D Tissot
(74) *Attorney, Agent, or Firm* — Sughrue Mion, PLLC

(57) ABSTRACT

A deflection control apparatus is configured to perform a deflection control in which a subject vehicle is deflected by a braking force difference between left and right wheels. The deflection control apparatus is provided with a releaser configured to release the deflection control if a steering operation, which is an operation of deflecting the subject vehicle in a direction opposite to a direction in which the subject vehicle is deflected by the deflection control, is detected during the deflection control. When releasing the deflection control, the releaser is configured to reduce a controlled variable over a predetermined time, which is shorter than a fall time of the controlled variable when the deflection control is ended without being released, and which becomes longer, as the controlled variable increases when the steering operation is detected.

2 Claims, 6 Drawing Sheets

DEFLECTION CONTROL APPARATUS

CROSS-REFERENCE TO RELATED APPLICATIONS

This application is based upon and claims the benefit of priority of the prior Japanese Patent Application No. 2017-039595, filed on Mar. 2, 2017, the entire contents of which are incorporated herein by reference.

BACKGROUND

1. Technical Field

Embodiments of the present disclosure relate to a deflection control apparatus configured to deflect a vehicle, and particularly relate to a deflection control apparatus configured to deflect a vehicle by using a braking force difference between left and right wheels.

2. Description of the Related Art

For this type of apparatus, for example, there has been proposed an apparatus configured to generate a yaw moment in a direction of avoiding lane departure by using a braking force difference between left and right wheels when there is a possibility that a subject vehicle or a host vehicle departs or deviates from a driving lane (refer to Japanese Patent Application Laid Open No. 2006-282168 (Patent Literature 1)).

A control of generating the yaw moment by using the braking force difference between the left and right wheels (hereinafter, referred to as a "deflection control", as occasion demands) is performed independently of a driver's will. If the driver performs an operation (particularly, a steering operation) when the deflection control is performed, the deflection control is released (i.e., stopped) in many cases in order to prioritize the driver's will.

By the way, in the deflection control, the yaw moment is generated due to the braking force difference between the left and right wheels; namely, the yaw moment is generated without changing a steering angle. Thus, if the deflection control is released when the driver performs the steering operation, the yaw rate is generated due to the driver's steering operation (i.e., due to a change in the steering angle).

Specifically, if the deflection control causes a vehicle to be turned to one of left and right sides and causes the yaw rate to be generated, the driver supposedly performs a steering operation of turning the vehicle to the other side of left and right sides in order to cancel or reduce the unintentionally generated yaw rate. In this case, if the deflection control is released, the yaw moment caused by the braking force difference between the left and right wheels may be eliminated. As a result, the vehicle is turned to the other side of left and right sides due to the driver's steering operation, and a yaw rate that is not expected by the driver may be generated.

As described above, if the deflection control is released simply on condition that the driver performs the steering operation when the deflection control is performed, the release possibly gives a sense of discomfort to the driver, which is technically problematic.

SUMMARY

In view of the aforementioned problem, it is therefore an object of embodiments of the present disclosure to provide a deflection control apparatus that allows the deflection control to be released while reducing the driver's discomfort when the driver performs the steering operation during the deflection control.

The above object of embodiments of the present disclosure can be achieved by a deflection control apparatus configured to perform a deflection control in which a subject vehicle is deflected by a braking force difference between left and right wheels, the vehicle control apparatus provided with: a releaser configured to release the deflection control if a steering operation, which is an operation of deflecting the subject vehicle in a direction opposite to a direction in which the subject vehicle is deflected by the deflection control, is detected during the deflection control, wherein when releasing the deflection control, the releaser is configured to reduce a controlled variable associated with the deflection control over a predetermined time, which is shorter than a fall time of the controlled variable associated with the deflection control when the deflection control is ended without being released, and which becomes longer, as the controlled variable increases when the steering operation is detected.

In the deflection control apparatus, when the deflection control is released due to the steering operation, the controlled variable associated with the deflection control when the steering operation is detected is taken into account. Thus, according to the deflection control apparatus, the driver's discomfort can be reduced, in comparison with when the deflection control is released simply because the steering operation is detected without consideration of the controlled variable associated with the deflection control. The expression "when the steering operation is detected" may mean not only at a time point at which the steering operation is detected, but also at a time point that is a small amount of time before or after the detection time point.

In addition, in the deflection control apparatus, when the deflection control is released, the controlled variable is reduced in a shorter time than the fall time of the controlled variable when the deflection control is ended without being released (i.e. when the deflection control is so-called successfully or normally ended). If it takes a relatively long time for the controlled variable associated with the deflection control to have a lower value (e.g., zero) after the detection of the steering operation, the subject vehicle may have a relatively large amount of the deflection due to the deflection control in a direction that is not desired by the driver, even though the driver performs the steering operation. According to the deflection control apparatus, however, it takes only a relatively short time for the controlled variable associated with the deflection control to have the lower value after the detection of the steering operation. It is thus possible to suppress the amount of the deflection caused by the deflection control. As a result, the driver's discomfort can be reduced.

The "fall time of the controlled variable when the deflection control is ended without being released" means, for example, a time length from a time point at which the controlled variable starts to decrease after the controlled variable reaches a maximum value (or from a time point at which the controlled variable reaches a value that is smaller than the maximum value by a predetermined amount) to a time point at which the controlled variable reaches the lower value (e.g., zero).

In one aspect of the deflection control apparatus according to embodiments of the present disclosure, the releaser is configured to set a smaller gradually decreasing slope of the controlled variable, as the controlled variable when the steering operation is detected increases. According to this aspect, it is possible to release the deflection control while reducing the driver's discomfort.

The nature, utility, and further features of this disclosure will be more clearly apparent from the following detailed description with reference to embodiments of the disclosure when read in conjunction with the accompanying drawings briefly described below.

DETAILED DESCRIPTION OF THE EMBODIMENTS

A deflection control apparatus according to an embodiment of the present disclosure will be explained with reference to FIG. 1 to FIG. 8B. In the following embodiment, a vehicle equipped with the deflection control apparatus according to embodiments of the present disclosure is used for explanation.

(Configuration of Vehicle)

Figure 1:
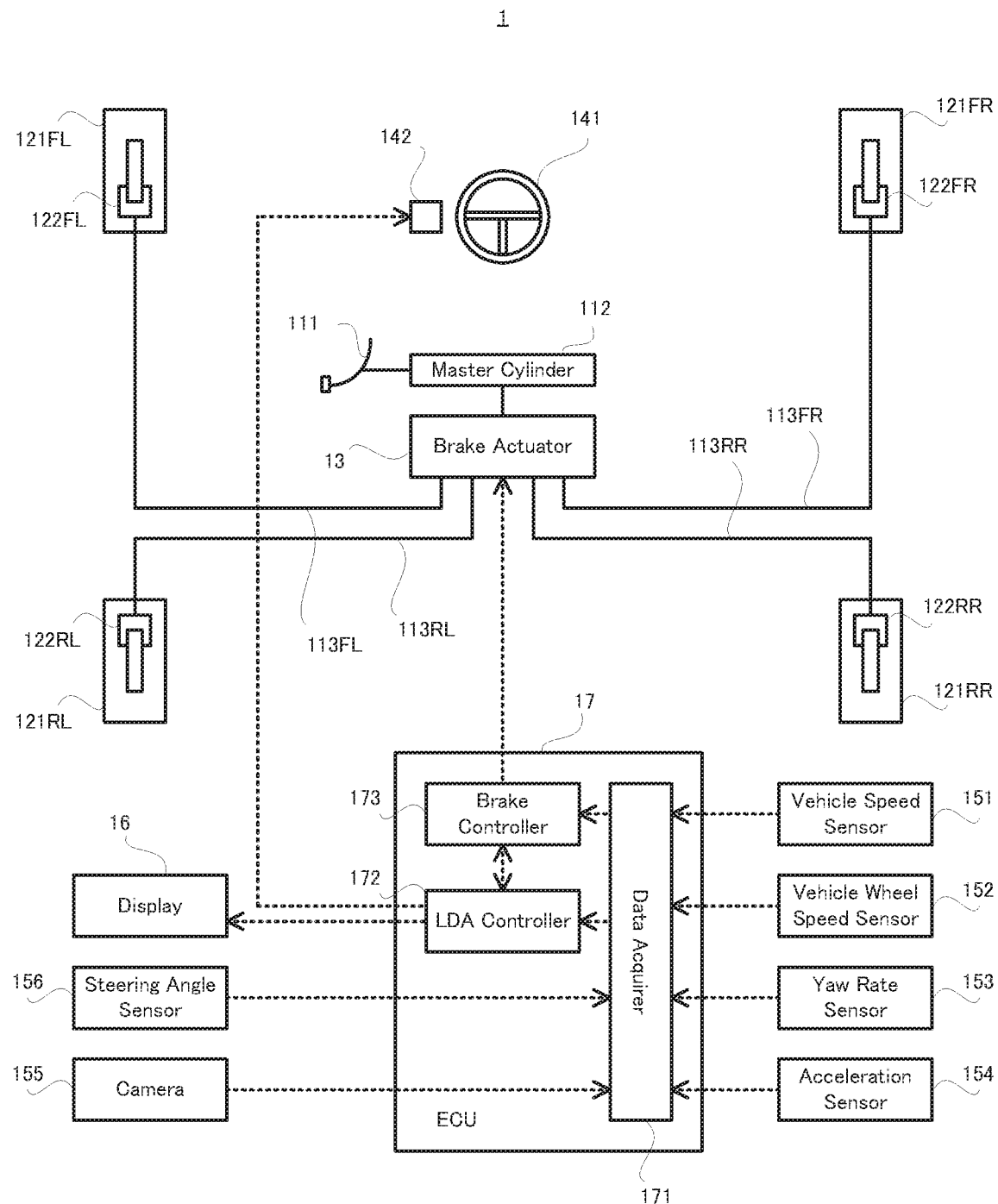
FIG. 1 is a block diagram illustrating a configuration of a vehicle according to an embodiment.

A configuration of a vehicle 1 equipped with the deflection control apparatus according to the embodiment will be explained with reference to FIG. 1. FIG. 1 is a block diagram illustrating the configuration of the vehicle 1 according to the embodiment.

In FIG. 1, the vehicle 1 is provided with a brake pedal 111, a master cylinder 112, a brake actuator 13, a wheel cylinder 122FL provided on a front left wheel 121FL, a wheel cylinder 122RL provided on a rear left wheel 121RL, a wheel cylinder 122FR provided on a front right wheel 121FR, a wheel cylinder 122RR provided on a rear right wheel 121RR, and brake pipes 113FL, 113RL, 113FR, and 113RR.

The vehicle 1 is further provided with a steering wheel 141, a vibration actuator 142, a vehicle speed sensor 151, a vehicle wheel speed sensor 152, a yaw rate sensor 153, an acceleration sensor 154, a camera 155, a steering angle sensor 156, a display 16, and an electronic control unit (ECU) 17, which is a specific example of the "deflection control apparatus" according to embodiments of the present disclosure.

The master cylinder 112 is configured to adjust a pressure of brake fluid (or any fluid) in the master cylinder 112 in accordance with a step amount of the brake pedal 111. The pressure of the brake fluid in the master cylinder 112 is transmitted to the wheel cylinders 122FL, 122RL, 122FR, and 122RR respectively via the brake pipes 113FL, 113RL, 113FR, and 113RR. As a result, braking forces corresponding to pressures of the brake fluid transmitted to the wheel cylinders 122FL, 122RL, 122FR, and 122RR are respectively applied to the front left wheel 121FL, the rear left wheel 121RL, the front right wheel 121FR, and the rear right wheel 121RR.

The brake actuator 13 is configured to adjust the pressure of the brake fluid transmitted to each of the wheel cylinders 122FL, 122RL, 122FR, and 122RR, independently of the step amount of the brake pedal 111, under control of the ECU 17. Therefore, the brake actuator 13 is configured to adjust the braking force applied to each of the front left wheel 121FL, the rear left wheel 121RL, the front right wheel 121FR, and the rear right wheel 121RR, independently of the step amount of the brake pedal 111.

The steering wheel 141 is an operator operated by a driver to steer the vehicle 1 (i.e., to turn wheels to be steered or turned). The vibration actuator 142 is configured to vibrate the steering wheel 141, under the control of the ECU 17.

The ECU 17 is configured to control entire operation of the vehicle 1. Particularly in the embodiment, the ECU 17 is configured to perform a lane departure suppressing operation for suppressing departure or deviation of the vehicle 1 from a driving lane on which the vehicle 1 is currently traveling. In other words, the ECU 17 functions as a control apparatus for realizing so-called LDA (Lane Departure Alert) or LDP (Lane Departure Prevention).

In order to perform the lane departure suppressing operation, the ECU 17 is provided with a data acquirer 171, a LDA controller 172, and a brake controller 173, as processing blocks logically realized, or processing circuits physically realized inside the ECU 17.

(Lane Departure Suppressing Operation).

Next, the lane departure suppressing operation according to the embodiment will be explained with reference to a flowchart in FIG. 2.

Figure 2:
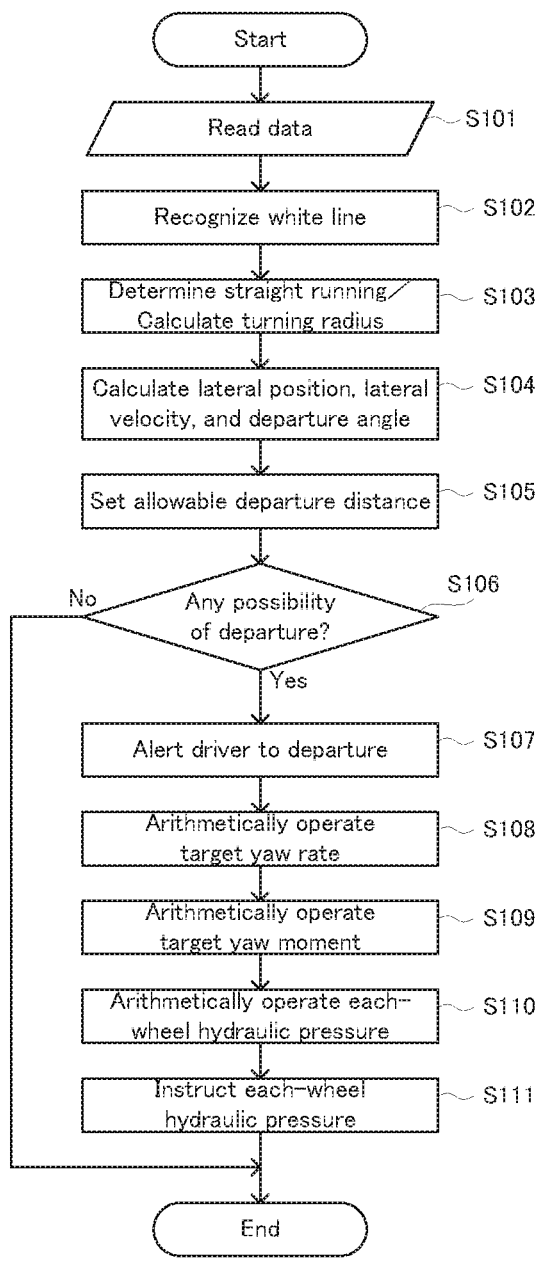
FIG. 2 is a flowchart illustrating a lane departure suppressing operation according to the embodiment.

In FIG. 2, firstly, the data acquirer 171 obtains detection data indicating detection results of the vehicle speed sensor 151, the vehicle wheel speed sensor 152, the yaw rate sensor 153, the acceleration sensor 154, and the steering angle sensor 156, and image data indicating images taken by the camera 155 (step S101).

The LDA controller 172 analyzes the image data obtained in the step S101, thereby specifying a lane edge of the driving lane on which the vehicle 1 is currently traveling (or a "white line" disclosed in the embodiment as an example of the lane edge) in the images taken by the camera 155 (step S102). A detailed explanation of a method of recognizing the white line will be omitted because the existing technique/technology can be applied to the method.

The LDA controller 172 determines whether or not the driving lane on which the vehicle 1 is currently traveling is a straight lane or a curve, on the basis of the white line specified in the step S102, and calculates a curvature radius of the driving lane if the driving lane is determined to be the curve (step S103). The curvature radius of the driving lane is substantially equivalent to a curvature radius of the white line. Thus, the LDA controller 172 may calculate the curvature radius of the white line specified in the step S102 and may treat the calculated curvature radius as the curvature radius of the driving lane.

The LDA controller 172 further calculates a current lateral position, a current lateral velocity, and a current departure angle of the vehicle 1, on the basis of the white line specified in the step S102 (step S104). Here, the "lateral position" means a distance from the center of the driving lane to the vehicle 1 (or typically, a distance to the center of the vehicle 1) in a lane width direction, which is orthogonal to a direction in which the driving lane extends (or a lane extension direction). The "lateral velocity" means a velocity of the vehicle 1 in the lane width direction. The "departure angle" means an angle made by the driving lane and a longitudinal direction axis of the vehicle 1 (i.e., an angle made by the white line and the longitudinal direction axis of the vehicle 1).

The LDA controller 172 further sets an allowable departure distance (step S105). The allowable departure distance indicates an allowable maximum value of a departure distance of the vehicle 1 from the driving lane (i.e., a departure distance of the vehicle 1 from the white line) when the vehicle 1 departs from the driving lane.

For example, the allowable departure distance may be set in the following manner; namely, the LDA controller 172 may set the allowable departure distance from the viewpoint of satisfying requirements of law and regulations (e.g., requirements of new car assessment programme (NCAP)). A method of setting the allowable departure distance is not limited to this example.

Then, the LDA controller 172 determines whether or not there is a possibility that the vehicle 1 departs from the driving lane on which the vehicle 1 is currently traveling (step S106). Specifically, for example, the LDA controller 172 may calculate a future position (e.g., in several to several ten seconds) of the vehicle 1, on the basis of a current velocity, the current lateral position, the current lateral velocity, or the like of the vehicle 1. Then, the LDA controller 172 may determine whether or not the vehicle 1 goes across or is on the white line in the future position. If it is determined that the vehicle 1 goes across or is on the white line in the future position, the LDA controller 172 may determine that there is the possibility that the vehicle 1 departs from the driving lane.

In the determination in the step S106, if it is determined that there is no possibility that the vehicle 1 departs from the driving lane (the step S106: No), the lane departure suppressing operation illustrated in FIG. 2 is ended. The LDA controller 172 then restarts the lane departure suppressing operation illustrated in FIG. 2 after a lapse of a first predetermined period (e.g., several milliseconds to several ten milliseconds). In other words, the lane departure suppressing operation illustrated in FIG. 2 is repeated with a period corresponding to the first predetermined period.

On the other hand, in the determination in the step S106, if it is determined that there is the possibility that the vehicle 1 departs from the driving lane (the step S106: Yes), the LDA controller 172 alerts the driver of the vehicle 1 to the possibility of the departure of the vehicle 1 from the driving lane (step S107). Specifically, the LDA controller 172 may control the display 16, for example, to display an image indicating the possibility of the departure of the vehicle 1 from the driving lane, and/or may control the vibration actuator 142 to inform the driver of the possibility of the departure of the vehicle 1 from the driving lane by using the vibration of the steering wheel 141.

In parallel with the step S107, the LDA controller 172 performs a departure avoidance control (steps S108 to S111). At this time, the LDA controller 172 may turn on a flag associated with the departure avoidance control. Here, the departure avoidance control is a control in which a yaw moment in a direction of avoiding the departure is applied to the vehicle 1 so that the departure distance of the vehicle 1 from the driving lane is within the allowable departure distance. The "departure avoidance control" according to the embodiment is an example of the "deflection control" according to embodiments of the present disclosure.

In the departure avoidance control according to the embodiment, a braking force is applied to at least one of the front left wheel 121FL, the rear left wheel 121RL, the front right wheel 121FR, and the rear right wheel 121RR so that there is a braking force difference between the left and right wheels. As a result, the yaw moment in the direction of avoiding the departure is applied to the vehicle 1. Hereinafter, the departure avoidance control will be specifically explained.

The LDA controller 172 arithmetically operates a target yaw rate so that the vehicle 1, which is leaving from the center of the driving lane, travels along a target track that is directed to the center of the driving lane (i.e., a traveling line to be targeted) (step S108).

The LDA controller 172 then calculates a yaw moment to be applied to the vehicle 1 as a target yaw moment, in order to generate the target yaw rate in the vehicle 1 (step S109). For example, the LDA controller 172 may calculate the target yaw moment by converting the target yaw rate to the target yaw moment on the basis of a predetermined transfer function.

The LDA controller 172 then calculates a braking force that can achieve the target yaw moment. At this time, the LDA controller 172 may individually calculate the braking forces applied to the front left wheel 121FL, the rear left wheel 121RL, the front right wheel 121FR, and the rear right wheel 121RR. The LDA controller 172 transmits a signal indicating the calculated braking force to the brake controller 173.

The brake controller 173 calculates a pressure command value for designating the pressure of the brake fluid required to generate the braking force, on condition that the signal indicating the braking force is received from the LDA controller 172 (step S110). At this time, the brake controller 173 may individually calculate the pressure command values for designating the pressures of the brake fluid inside the wheel cylinders 122FL, 122RL, 122FR, and 122RR.

The brake controller 173 then controls the brake actuator 13 on the basis of the pressure command value (step S111). As a result, the braking force corresponding to the pressure command value is applied to at least one of the front left wheel 121FL, the rear left wheel 121RL, the front right wheel 121FR, and the rear right wheel 121RR. In other words, the yaw moment in the direction of avoiding the departure is applied to the vehicle 1 due to the braking force difference between the left and right wheels.

The LDA controller 172 then restarts the lane departure suppressing operation illustrated in FIG. 2 after a lapse of the first predetermined period. At this time, the flag associated with the departure avoidance control is on, and thus, the lane departure suppressing operation is started while the yaw moment caused by the departure avoidance control is applied to the vehicle 1. In the determination in the step S106 performed again, if it is determined that there is the possibility that the vehicle 1 departs from the driving lane (the step S106: Yes), the process after the step S107 is performed. Thus, the application of the yaw moment caused by the departure avoidance control to the vehicle 1 is continued. On the other hand, in the determination in the step S106 performed again, if it is determined that there is no possibility that the vehicle 1 departs from the driving lane (the step S106: No), the flag associated with the departure avoidance control is turned off, and the application of the yaw moment caused by the departure avoidance control to the vehicle 1 is ended.

(Control Release Operation)

Next, a control release operation performed in parallel with the aforementioned lane departure suppressing operation will be explained with reference to a flowchart in FIG. 3. The control release operation according to the embodiment is an operation for releasing the departure avoidance control in order to prioritize the driver's will if a steering operation performed by the driver of the vehicle 1 is detected when the departure avoidance control (the steps S108 to S111 in FIG. 2) is performed.

Figure 3:
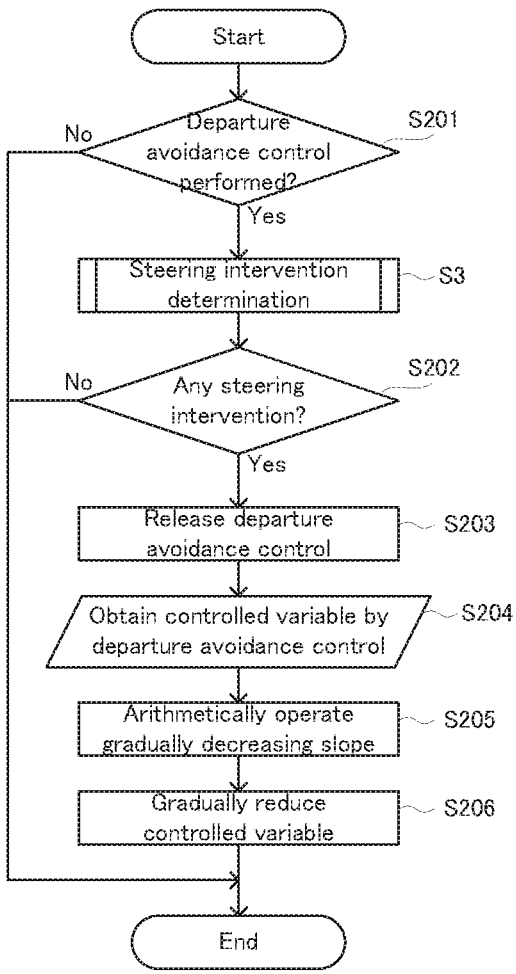
FIG. 3 is a flowchart illustrating a control release operation according to the embodiment.

In FIG. 3, the LDA controller 172 determines whether or not the departure avoidance control is performed (step S201). Here, the LDA controller 172 may determine that the departure avoidance control is performed when the flag associated with the departure avoidance control is on. In the determination, if it is determined that the departure avoidance control is not performed (the step S201: No), the control release operation illustrated in FIG. 3 is ended. The LDA controller 172 then restarts the control release operation illustrated in FIG. 3 after a lapse of a second predetermined period (e.g., several milliseconds to several ten milliseconds). In other words, the control release operation illustrated in FIG. 3 is repeated with a period corresponding to the second predetermined period.

On the other hand, in the determination in the step S201, if it is determined that the departure avoidance control is performed (the step S201: Yes), the LDA controller 172 performs steering intervention determination (step S3). The steering intervention determination is to determine whether or not the driver of the vehicle 1 performs a steering operation when the departure avoidance control is performed. The steering intervention determination will be described in detail later.

The LDA controller 172 then determines whether or not there is a steering intervention on the basis of a result of the steering intervention determination (step S202). In the determination, if it is determined that there is no steering intervention (the step S202: No), the control release operation illustrated in FIG. 3 is ended. The LDA controller 172 restarts the control release operation illustrated in FIG. 3 after a lapse of the second predetermined period.

On the other hand, in the determination in the step S202, if it is determined that there is the steering intervention (the step S202: Yes), the LDA controller 172 releases the departure avoidance control (step S203). The "release" associated with the step S203 means that the steps S108 to S111 in FIG. 2 are stopped, and the yaw moment caused by the departure avoidance control is still applied to the vehicle 1. Please note that the yaw moment caused by the departure avoidance control does not immediately become zero by the step S203. The LDA controller 172 performs the following steps S204 to S206 in order to reduce the yaw moment caused by the departure avoidance control, which is applied to the vehicle 1.

The LDA controller 172 obtains a controlled variable associated with the departure avoidance control when it is determined that there is the steering intervention, in parallel with the step S203 (step S204). The controlled variable associated with the departure avoidance control is a physical quantity or a parameter, such as, for example, the braking force, the target yaw rate, and the target yaw moment, which is controlled by the departure avoidance control or which defines the content of the departure avoidance control. In the embodiment, an example of the controlled variable associated with the departure avoidance control is "target yaw rate".

Figure 4:
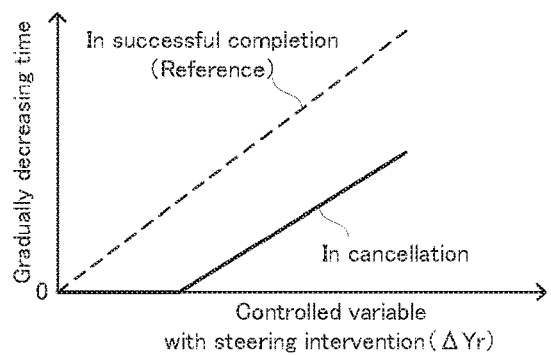
FIG. 4 is a diagram illustrating an example of a map that defines a relation between a controlled variable and a gradually decreasing time when a departure avoidance control is released.
Figure 5:
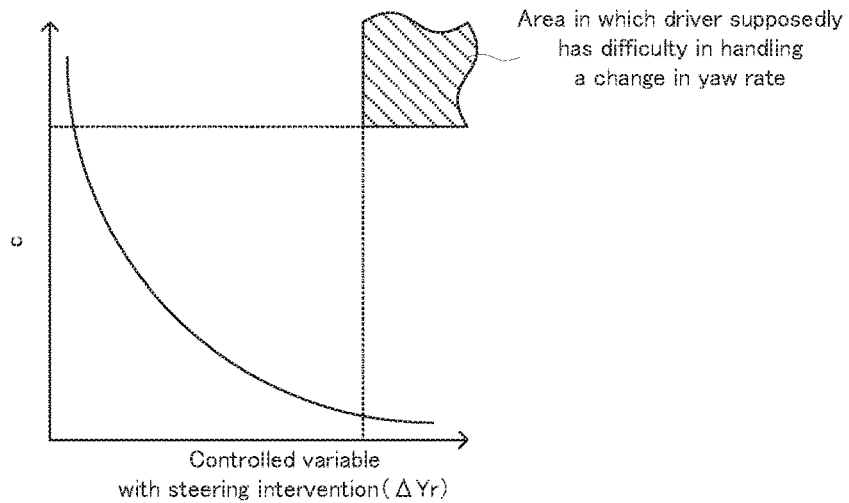
FIG. 5 is a diagram illustrating an example of a map that defines a relation between the controlled variable and a gradually decreasing slope when the departure avoidance control is released.
Figure 6:
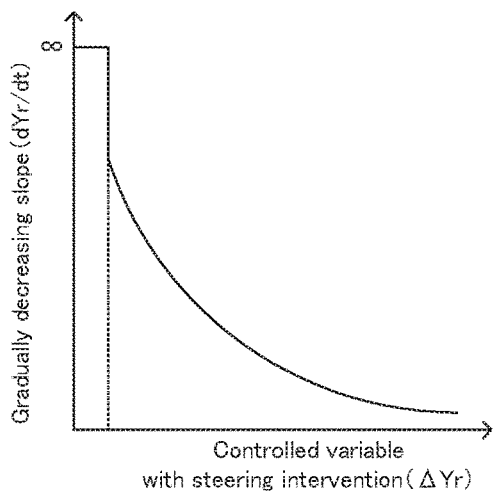
FIG. 6 is a diagram illustrating another example of the map that defines the relation between the controlled variable and the gradually decreasing slope when the departure avoidance control is released.

The LDA controller 172 then arithmetically operates a gradually decreasing slope for reducing the target yaw rate, on the basis of the target yaw rate, which is the controlled variable associated with the departure avoidance control (step S205). Specifically, the LDA controller 172 may arithmetically operate the gradually decreasing slope with reference to a map that defines a relation between the yaw rate and the gradually decreasing slope or a gradually decreasing time. Specific examples of the map are illustrated in FIG. 4 to FIG. 6. The LDA controller 172 may arithmetically operate the gradually decreasing slope, with reference to any of the maps illustrated in FIG. 4 to FIG. 6.

The map illustrated in FIG. 4 defines a relation between the yaw rate and the gradually decreasing time. In the map illustrated in FIG. 4, if the yaw rate is relatively low, the gradually decreasing time is considered to be zero (i.e., the gradually decreasing slope is considered to be infinite). On the other hand, if the yaw rate is relatively high, the gradually decreasing time is considered to increase (i.e., the gradually decreasing slope is considered to decrease) as the yaw rate increases. The gradually decreasing time when the departure avoidance control is released is shorter than the gradually decreasing time when the departure avoidance control is not released and the control release operation is (so-called successfully or normally) ended (i.e., the fall time).

When the departure avoidance control is released, a range of the yaw rate that allows the gradually decreasing time to be zero may be set as a range of the yaw rate that can be handled by the driver, for example, even though the yaw moment caused by the departure avoidance control is immediately eliminated and the yaw rate is generated due to the driver's steering operation. Here, it is assumed that when the yaw rate is generated due to the departure avoidance control, the driver performs the steering operation that cancels the yaw rate; namely, it is assumed that the steering operation causes the yaw rate to be generated in a direction opposite to and with the same magnitude as those of the yaw rate caused by the departure avoidance control.

The map illustrated in FIG. 5 defines a relation between the yaw rate and the gradually decreasing slope. The map illustrated in FIG. 5 defines the gradually decreasing slope with respect to the yaw rate, in an area separated as much as possible from an area in which the driver supposedly has difficulty in handling a change in the yaw rate, on coordinates defined by the yaw rate and the gradually decreasing slope. As illustrated in FIG. 5, as the yaw rate increases, the gradually decreasing slope decreases (i.e., the gradually decreasing time increases). The gradually decreasing slope when the departure avoidance control is released is greater than the gradually decreasing slope when the departure avoidance control is successfully or normally ended (i.e., a fall slope).

The map illustrated in FIG. 6 defines a relation between the yaw rate and the gradually decreasing slope. Particularly in the map illustrated in FIG. 6, if the yaw rate is relatively low, the gradually decreasing slope is considered to be infinite (i.e., the gradually decreasing time is considered to be zero). On the other hand, if the yaw rate is relatively high, as in the map illustrated in FIG. 5, the gradually decreasing slope decreases (i.e., the gradually decreasing time increases) as the yaw rate increases.

Back in FIG. 3 again, after the step S205, the LDA controller 172 reduces the target yaw rate in accordance with the gradually decreasing time or the gradually decreasing slope of the target yaw rate, which is the controlled variable associated with the departure avoidance control (step S206). Specifically, the LDA controller 172 may calculate a braking force that realizes the gradually decreasing time or the gradually decreasing slope of the target yaw rate (or strictly speaking, a temporal change in the braking force), and may transmit a signal indicating the braking force to the brake controller 173. The brake controller 173 may calculate a pressure command value corresponding to the braking force indicated by the signal received from the LDA controller 172, and may control the brake actuator 13 on the basis of the pressure command value. As a result, the braking force difference between the left and right wheels may be eliminated, and the yaw moment caused by the departure avoidance control may become zero.

(Steering Intervention Determination)

Next, the steering intervention determination according to the embodiment will be explained. Here are two specific examples of the steering intervention determination.

1. First Determination Method

Figure 7A:
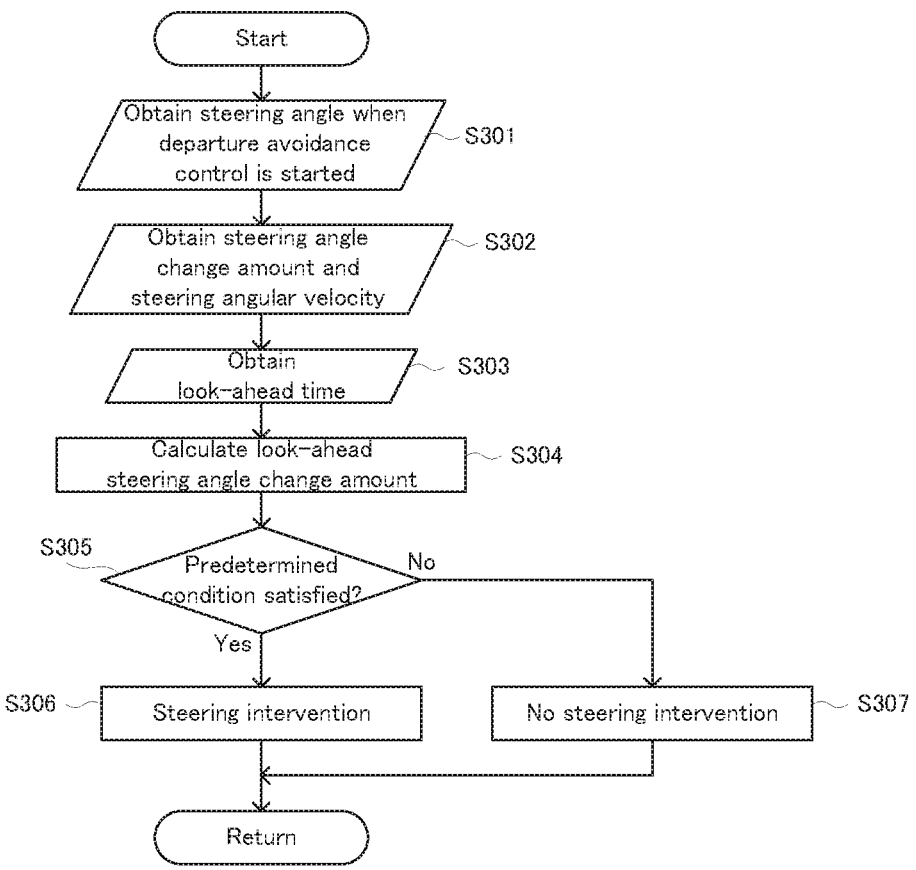
FIG. 7A is a flowchart illustrating a first method of steering intervention determination according to the embodiment.

A first determination method will be explained with reference to a flowchart in FIG. 7A. In FIG. 7A, the LDA controller 172 obtains a steering angle when the departure avoidance control is started, on the basis of the detection result of the steering angle sensor 156 obtained via the data acquirer 171 (step S301).

The LDA controller 172 obtains a steering angle change amount from a current steering angle based on the detection result of the steering angle sensor 156 and the steering angle when the departure avoidance control is started, and obtains a steering angular velocity based on the detection result of the steering angle sensor 156 (step S302).

In parallel with the steps S301 and S302, the LDA controller 172 obtains a look-ahead time or a pre-read time T set in advance (step S303). Here, the "look-ahead time T" may be set in accordance with, e.g., a time length in which the driver reflexively steers the steering wheel 141, or the like, such as 0.5 to 1.5 seconds.

The LDA controller 172 then calculates a look-ahead steering angle change amount, on the basis of the steering angle change amount and the steering angular velocity obtained in the step S302, and the look-ahead time T obtained in the step S303 (step S304). The look-ahead steering angle change amount may be specifically expressed as "(steering angle change amount)+(steering angular velocity)×T".

The LDA controller 172 then determines whether or not a predetermined condition is satisfied (step S305). Here, the predetermined condition includes (i) that an absolute value of the steering angle change amount is greater than a first predetermined value, (ii) that an absolute value of the steering angular velocity is greater than a second predetermined value, and (iii) that an absolute value of the look-ahead steering angle change amount is greater than a third predetermined value. The LDA controller 172 determines that the predetermined condition is satisfied if any of the conditions (i) to (iii) is satisfied.

In the determination in the step S305, if it is determined that the predetermined condition is satisfied (the step S305: Yes), the LDA controller 172 determines that there is a steering intervention (step S306). On the other hand, in the determination in the step S305, if it is determined that the predetermined condition is not satisfied (the step S305: No), the LDA controller 172 determines that there is no steering intervention (step S307).

Figure 7B:
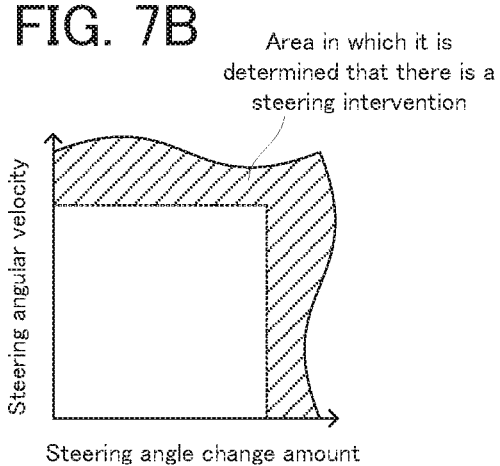
FIG. 7B is a diagram illustrating an area in which it is determined that there is a steering intervention in a coordinate system defined by a steering angle change amount and a steering angular velocity for the first method.

In the first determination method illustrated in FIG. 7A, it is determined that there is the steering intervention in a hatched area in a coordinate system defined by the steering angle change amount and the steering angular velocity, which is illustrated in FIG. 7B.

2. Second Determination Method

A second determination method will be explained with reference to a flowchart in FIG. 8A. For the second determination method, the same explanation as that of the first determination method will be omitted, and the same parts on the drawing will carry the same reference numerals.

Figure 8A:
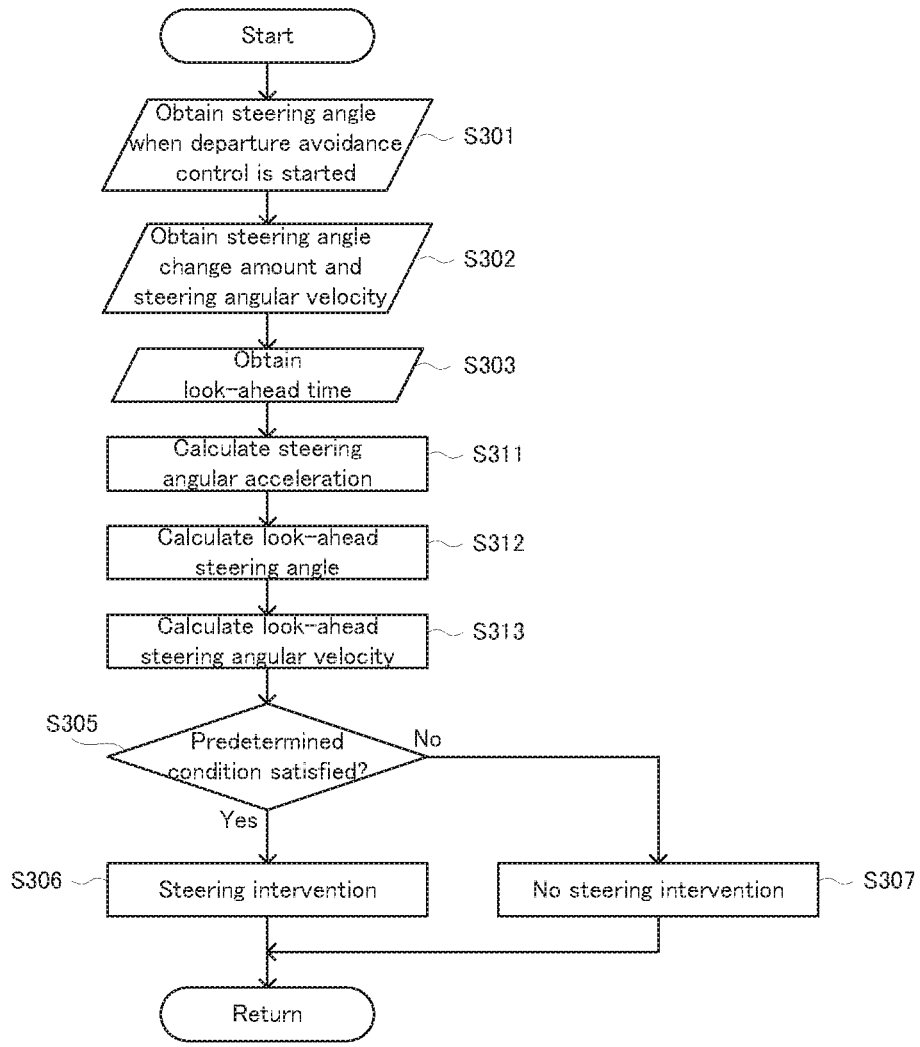
FIG. 8A is a flowchart illustrating a second method of the steering intervention determination according to the embodiment.

In FIG. 8A, after the step S303, the LDA controller 172 calculates a steering angular acceleration, on the basis of the steering angular velocity obtained in the step S302 (step S311).

The LDA controller 172 then calculates a look-ahead steering angle, on the basis of the steering angle change amount and the steering angular velocity obtained in the step S302, the look-ahead time T obtained in the step S303, and the steering angular acceleration calculated in the step S311 (step S312). The look-ahead steering angle may be specifically expressed as "(steering angle change amount)+(steering angular velocity)×T+(steering angular acceleration)×T²/2". In parallel with the step S312, the LDA controller 172 calculates a look-ahead steering angular velocity, on the basis of the steering angular velocity, the look-ahead time T, and the steering angular acceleration (step S313). The look-ahead steering angular velocity may be specifically expressed as "(steering angular velocity)+(steering angular acceleration)×T".

The LDA controller 172 then determines whether or not a predetermined condition is satisfied (the step S305). Here, the predetermined condition includes (i) that the absolute value of the steering angle change amount is greater than the first predetermined value, (ii) that the absolute value of the steering angular velocity is greater than the second predetermined value, (iii) that an absolute value of the look-ahead steering angle is greater than a fourth predetermined value, and (iv) an absolute value of the look-ahead steering angular velocity is greater than a fifth predetermined value. The LDA controller 172 determines that the predetermined condition is satisfied if any of the conditions (i) to (iv) is satisfied.

Figure 8B:
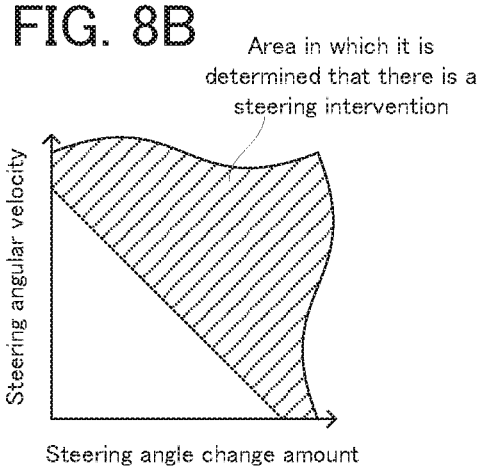
FIG. 8B is a diagram illustrating an area in which it is determined that there is a steering intervention in the coordinate system by the steering angle change amount and the steering angular velocity for the second method.

In the second determination method illustrated in FIG. 8A, it is determined that there is the steering intervention in a hatched area in the coordinate system defined by the steering angle change amount and the steering angular velocity, which is illustrated in FIG. 8B.

In the steering intervention determination illustrated in FIG. 7A and FIG. 8A, a steering direction is not considered. Thus, in terms of control, even when the driver performs a steering operation of deflecting the vehicle 1 in the same direction as a direction in which the vehicle 1 is deflected by the departure avoidance control, it is determined that there is the steering intervention, and the departure avoidance control is released. In view of the driver's action when the yaw rate is generated in a direction that is not intended by the driver, however, it is considered that the departure avoidance control is released in most cases by a steering operation of deflecting the vehicle 1 in a direction opposite to the direction in which the vehicle 1 is deflected by the departure avoidance control (i.e, the steering intervention).

(Technical Effect)

In the embodiment, if the departure avoidance control is released by the driver's steering invention, the gradually decreasing time or the gradually decreasing slope of the controlled variable is determined on the basis of the controlled variable associated with the departure avoidance control (which is herein the target yaw rate) when the departure avoidance control is released. Thus, if the departure avoidance control is released by the driver's steering invention, it is possible to reduce the controlled variable associated with the departure avoidance control, and it is also possible to suppress a change in the yaw rate caused by the driver's steering operation to an extent that the driver can handle. As a result, the driver's discomfort can be reduced when the departure avoidance control is released by the driver's steering invention.

In the steering intervention determination according to the embodiment, the "look-ahead time T" is introduced. If the look-ahead time T is not introduced, the steering intervention is not detected until the actual steering angle change amount or the actual steering angular velocity exceeds a threshold value. In this case, if the driver relatively slowly steers the steering wheel 141, it takes a relatively long time to detect the steering intervention. As a result, the departure avoidance control may not be released even though the driver has started the steering, and the vehicle 1 may have a relatively large amount of the deflection due to the departure avoidance control. By introducing the "look-ahead time T" and calculating, e.g., the "look-ahead steering angle change amount", the "look-ahead steering angle", and the "look-ahead steering angular velocity", the driver's steering intervention can be detected, relatively early. As a result, it is possible to relatively early release the departure avoidance control can be released, and it is possible to suppress the amount of the deflection of the vehicle 1 caused by the departure avoidance control when the departure avoidance control is released.

Moreover, in the embodiment, when the departure avoidance control is released, the controlled variable associated with the departure avoidance control is reduced in a shorter time (or in a smaller slope) than the fall time (or the fall slope) when the departure avoidance control is successfully or normally ended. It is thus possible to relatively early eliminate the braking force difference between the left and right wheels caused by the departure avoidance control. As a result, it is possible to suppress the amount of the deflection of the vehicle 1 caused by the departure avoidance control when the departure avoidance control is released.

The "LDA controller 172" and the "brake controller 173" according to the embodiment are an example of the "releaser" according to embodiments of the present disclosure.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come within the meaning and range of equivalency of the claims are therefore intended to be embraced therein.

What is claimed is:

1. A deflection control apparatus configured to perform a deflection control in which a subject vehicle is deflected by a braking force difference between left and right wheels, said vehicle control apparatus comprising:
   a processor configured to:
      release the deflection control based on a steering operation, which is an operation of deflecting the subject vehicle in a direction opposite to a direction in which the subject vehicle is deflected by the deflection control, being detected during the deflection control, wherein the releasing the deflection control includes reducing a controlled variable associated with the deflection control over a predetermined time, which is shorter than a fall time of the controlled variable associated with the deflection control that is based on the deflection control ending without being released, and which becomes longer as the controlled variable increases based on the steering operation being detected.

2. The deflection control apparatus according to claim 1, wherein the processor is further configured to set a smaller gradually decreasing slope of the controlled variable, as the controlled variable increases based on the steering operation being detected.

* * * * *